(12) United States Patent
Bajwa

(10) Patent No.: US 11,438,344 B1
(45) Date of Patent: Sep. 6, 2022

(54) SYSTEMS AND METHODS FOR SWITCH-BASED NETWORK SECURITY

(71) Applicant: Rashaad Bajwa, Monroe Township, NJ (US)

(72) Inventor: Rashaad Bajwa, Monroe Township, NJ (US)

(*) Notice: Subject to any disclaimer, the term of this patent is extended or adjusted under 35 U.S.C. 154(b) by 0 days.

(21) Appl. No.: 17/473,007

(22) Filed: Sep. 13, 2021

Related U.S. Application Data

(60) Provisional application No. 63/159,183, filed on Mar. 10, 2021.

(51) Int. Cl.
*H04L 9/40* (2022.01)
*H04L 49/25* (2022.01)
*H04L 45/74* (2022.01)

(52) U.S. Cl.
CPC .......... *H04L 63/1408* (2013.01); *H04L 45/74* (2013.01); *H04L 49/25* (2013.01); *H04L 63/0236* (2013.01); *H04L 63/08* (2013.01); *H04L 2463/082* (2013.01)

(58) Field of Classification Search
CPC ..... H04L 63/1408; H04L 45/74; H04L 49/25; H04L 63/0236; H04L 63/08
See application file for complete search history.

(56) References Cited

U.S. PATENT DOCUMENTS

| | | | |
|---|---|---|---|
| 5,928,363 A | 7/1999 | Ruvolo | |
| 7,979,555 B2 | 7/2011 | Ruthstein et al. | |
| 8,117,657 B1 | 2/2012 | Elrod et al. | |
| 8,255,996 B2 | 8/2012 | Elrod et al. | |
| 8,443,187 B1* | 5/2013 | Orr | H04L 63/08 713/155 |
| 10,250,627 B2 | 4/2019 | Mont et al. | |
| 10,277,618 B1 | 4/2019 | Wu et al. | |
| 10,742,677 B1 | 8/2020 | Wu et al. | |
| 2007/0038866 A1* | 2/2007 | Bardsley | H04L 63/0892 713/182 |
| 2017/0302553 A1* | 10/2017 | Zafer | H04W 28/0236 |
| 2019/0098019 A1 | 3/2019 | Coleman et al. | |
| 2019/0158480 A1* | 5/2019 | Murthy | H04L 63/102 |
| 2019/0372828 A1 | 12/2019 | Wu et al. | |
| 2020/0396218 A1 | 12/2020 | Crabtree et al. | |

\* cited by examiner

*Primary Examiner* — Oleg Korsak
(74) *Attorney, Agent, or Firm* — Wolf, Greenfield & Sacks, P.C.

(57) ABSTRACT

The techniques described herein related to methods, apparatuses, and computer readable media configured to provide automatic mitigation of security threats. The automatic mitigation includes monitoring network switch traffic that is associated with a port of the network switch, a MAC address of a connected device, or both. Based on a set of switch traffic rules, it is determined whether the network switch traffic is indicative of a potential network security threat. When is indicative of a potential network security threat, the network switch traffic associated with the port of the network switch, the MAC address of the device, or both, is restricted. Identification information for a user associated with the port of the network switch is provided to an authentication process that the user associated with the port may access. Upon receiving a valid authentication from the authentication process, derestricting the network switch traffic associated with the port.

20 Claims, 7 Drawing Sheets

SYSTEMS AND METHODS FOR SWITCH-BASED NETWORK SECURITY

CROSS-REFERENCE TO RELATED APPLICATION

This application claims the benefit under 35 U.S.C. § 119(e) of U.S. Provisional Patent Application Ser. No. 63/159,183, filed on Mar. 10, 2021, and entitled "SYSTEMS AND METHODS FOR SWITCH-BASED NETWORK SECURITY", which is hereby incorporated herein by reference in its entirety.

BACKGROUND

A local area network (LAN) is a type of network configuration that is commonly used to connect computing devices in many different scenarios. LANs typically include a group of computing nodes that are used to exchange information among user devices (e.g., personal computers), peripheral devices (e.g., printers), the Internet, and/or other servers and computing devices. Information can be sent and received between devices connected to the LAN, and the devices can also be provided access to the Internet (e.g., through an internet gateway protocol). Examples of LANs may range in size from small single residence networks (e.g., a home network, a small office) to large LANs (e.g., networks for university campuses, office buildings, or office building campuses).

Data exchanged through the LAN can include various types of data, such as personal and/or commercial data. Such data may include customer data, tax information, billing accounts, and/or other financial or otherwise confidential information. Given the potential value of such information, it is not uncommon for cyber security attacks to target such information. As such, it is important to implement network security processes to protect the LAN and data stored in and sent over the LAN. Firewalls and other internet gateway monitoring security techniques are designed to prevent potential threats from entering the LAN (e.g., via the Internet). By keeping threats out, firewalls can be used to create a safe local area network (e.g. intranet) such that information can be sent between nodes without cumbersome encrypting that can result in delayed data transfer.

SUMMARY

The techniques described herein provide for monitoring LAN traffic at one or more network switches and/or other physical or wireless access points that are used within the LAN. In some embodiments, the techniques include leveraging a set of one or more rules to monitor traffic and to detect potentially malicious activity. The techniques include automatically blocking some and/or all of the detected traffic (e.g., by shutting down an associated port of the switch and/or MAC address of a wireless device). The techniques further include automatically providing information to an authentication component or application that allows a user to verify in real-time that the traffic is legitimate (e.g., in the event of traffic inadvertently being classified as malicious when it is legitimate traffic). Upon a successful authentication, the techniques can immediately reenable the port and/or MAC address to allow the user device(s) to continue to use the LAN. As a result, the techniques provide for quick and immediate action in response to potentially harmful traffic, while providing users with the ability to easily reinitiate such traffic if the traffic is legitimate.

In one embodiment, there is provided a method for automatically mitigating a network security threat, the method comprising: monitoring network switch traffic and/or wireless traffic activity, wherein the traffic is associated with a port of the switch or wireless or physical MAC addresses; determining, based on a set of traffic rules, the network traffic is indicative of a potential network security threat; restricting the network traffic associated with the port of the switch or wireless or physical MAC address of a device; providing identification information, for a user associated with the port of the switch or MAC address, to an authentication process, such that a user associated with the port or MAC address may access the authentication process; and upon receiving a valid authentication from the authentication process, derestricting network switch traffic associated with the port or MAC address.

In another embodiment, there is provided at least one non-transitory computer-readable storage medium storing executable instructions and a processor configured to execute the instructions to perform method for automatically mitigating a network security threat.

In another embodiments, there is provided a computer system, comprising memory storing instructions, and a processor configured to execute the instructions to perform method for automatically mitigating a network security threat.

The foregoing summary is to be considered non-limiting.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
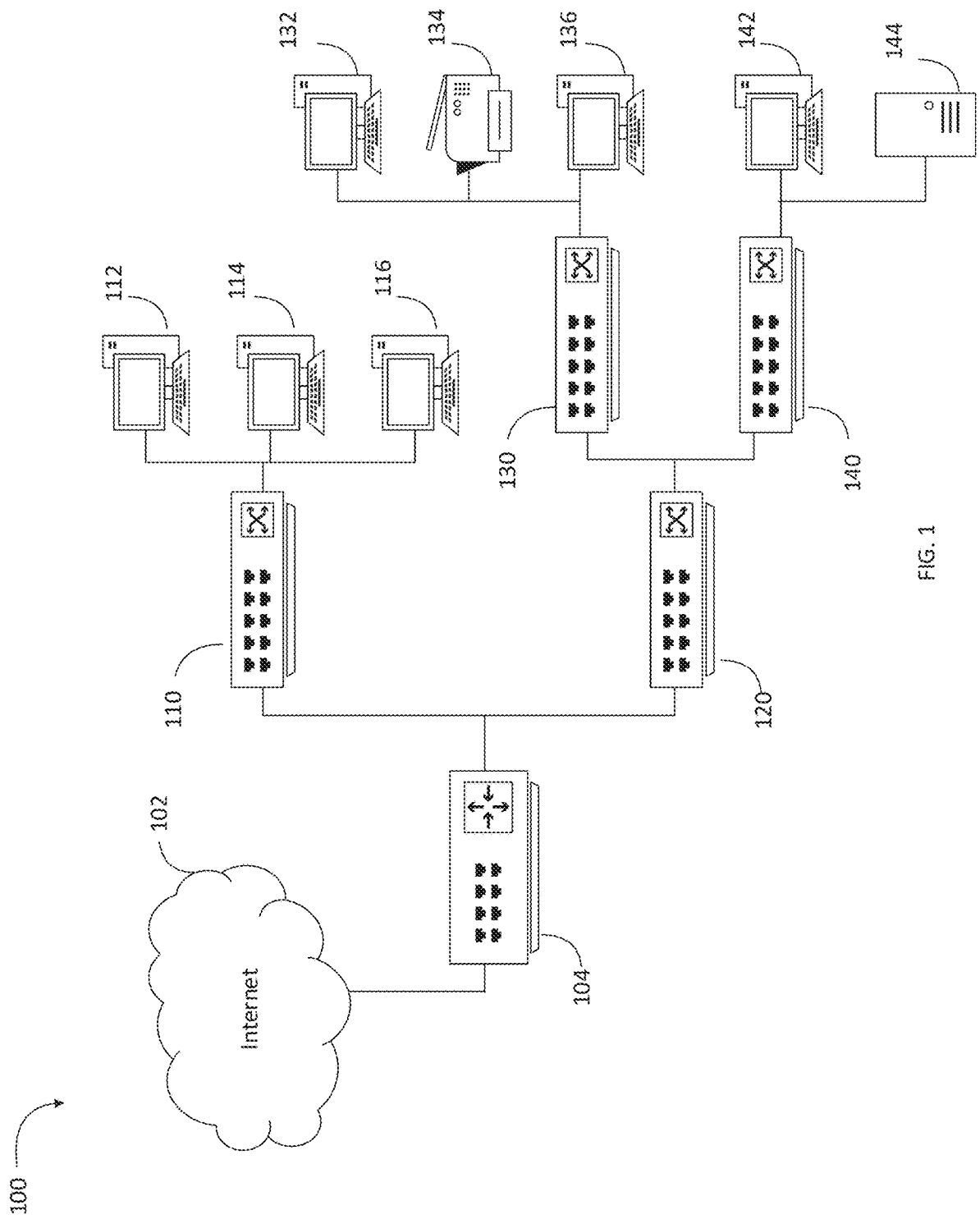
FIG. 1 is a schematic diagram of an exemplary local area network, according to some examples.

Firewalls and/or network gateways can be used to create safe sandbox-like network environments, designed to mitigate the risk of network security threats in a LAN by deploying the firewall/gateway between the LAN and the Internet. Firewalls, for example, can be configured to monitor incoming and outgoing network traffic and to block potentially dangerous network traffic (e.g., traffic associated with a potential security threat) from passing through the firewall into the LAN. However, such approaches are not perfect, and dangerous traffic can inadvertently make its way into a LAN. For example, one approach taken by hackers is to trick a user into downloading malicious software that infects the user's device. An infected user device may perform actions often without the user's knowledge, such as scanning for and connecting to other devices on the network through the user's network connection to collect data. As another example, another approach taken by hackers is to install malicious devices in the network (e.g., by using an employee of a company providing the LAN), such that when the device is connected to the network, the device can access other devices on the network to collect data.

The inventor has appreciated that a major shortcoming of sandbox-like approaches is that once threats are in the local network, the LANs typically have no mechanism for identifying and mitigating the threat. Therefore, once a threat has entered the network, firewalls or other devices designed to keep bad traffic out are not able detect the malicious activity between devices within the LAN.

The inventor has recognized and appreciated that systems and methods for switch and wireless based network security could be used to mitigate threats within a local area network. However, the inventor has appreciated that detecting potential threats, in a LAN, for mitigation can be challenging. In particular, LANs can have complex and dynamic architectures. For example, for large networks, LANs may include thousands of network nodes that connect devices of the network. These connections are provided by network switches working in concert with other network devices, such as routers, with the switch or access point generally being directly connected (e.g., a wired or wireless connection) to the user devices (e.g., laptops, desktops, printers, etc.). Therefore, since most (if not all) incoming and outgoing network traffic for a user device passes through its respective port on a switch, network security techniques that mitigate a potential security threat at the switch port and/or MAC address itself can be used to directly block a threat at the source, preventing further infection. However, it can be challenging at the switch level to differentiate normal traffic from traffic associated with a potential threat. For example, the content of the traffic from user devices can vary, and different user devices may have very different network behaviors, such that normal behavior for one device may not be the same as normal behavior for other devices connected to a switch or access point. For example, some devices, such as employee laptops, may be moved frequently between nodes of the network, while other devices, such as printers and servers, may remain connected to the same node for extended periods of time. Additionally, an employee laptop may communicate with many different nodes both inside and out of the network, while the printer may only receive signals from local sources located within the same geographic vicinity. Thus, the large quantity and diversity of network devices and their behavior make detecting network security threats at the switch or access point level challenging.

The inventor has also appreciated that another challenge in mitigating a potential security threat in a LAN can be quickly responding to a detected potential threat in a way that sufficiently mitigates the threat. In particular, the time between detecting the potential threat and responding to the threat can be a crucial factor in minimizing the risk associated with the threat. The longer a threat has access to the network, the greater the risk that the threat will infect additional devices and/or steal network data. A network security facility that blocks the network port or MAC address immediately after detected a potential security threat could therefore minimize the risk of the infection spreading to other devices and the risk of data theft. However, if the potential security threat is a false alarm and the network traffic is that of a legitimate user, then blocking the user's network port or MAC address would lock the user out of the network. Such inadvertent user lockouts could significantly disrupt the user's activity and ability to work (e.g., possibly preventing the user from meeting deadlines, submitting payments on time, etc.). In many cases, this is not an acceptable approach as it can further result in financial losses to the user or user's organization.

Therefore, to reduce the risk of disrupting a user's activity, most systems, upon detecting a potential threat, leave the traffic active and instead simply report the threat to a systems administrator for review (and the systems administrator is left to determine how to respond to the potential threat). While this prevents unintended network interruptions, the inventor has appreciated that a major deficiency of relying on a systems administrator to respond to threats is that the system administrator is not always available or responsive. Notifications may be sent to the administrator and may go unaddressed for minutes, hours, or even days. Additionally, if the system administrator receives frequent false reports, the system administrator may have a difficult time identifying legitimate threats from legitimate users and threats may not be appropriately identified. As a result, a threat response may not be implemented until after network data has been stolen.

The inventor has developed improvements to conventional techniques, including methods and systems for automatically detecting and mitigating potential network security threats. As discussed above, mitigating network security threats by blocking the switch port or MAC address associated with a potential threat runs against conventional techniques that typically avoid at all costs such automatic action, given the significant impact that automatically blocking traffic can have on legitimate network use. However, the inventor has appreciated that such automatic action can be the best way to prevent the spread of threats and the theft of important data. The inventor has therefore developed techniques that allow users to quickly (and autonomously) restore access to their network port or MAC address by providing an authentication mechanism that allows the system to automatically respond to threats as soon as the threat is detected without users becoming locked out of the network.

Accordingly, some embodiments are directed to systems and methods for automatically mitigating a network security threat. Network switch traffic is monitored (e.g., either at the switch itself or a device in communication with the switch), wherein the traffic is associated with port(s) of the switch (e.g., all traffic of a particular port) and/or one or more MAC addresses (e.g., physical and/or wireless MAC addresses) that are associated with the port(s). The techniques include determining, based on a set of switch traffic rules, whether the network switch traffic is indicative of a potential network security threat. If the traffic is indicative of a threat, the techniques restrict the network switch traffic associated with the relevant port(s) or MAC address(es) of the switch or network access point. The techniques also, in turn, provide identification information for user(s) associated with the port of the switch or MAC address to an authentication process, so that the user(s) associated with the port(s) or MAC address can authenticate the traffic as valid (and not illegitimate). Upon receiving a valid authentication from the authentication process, the techniques include derestricting the network switch traffic associated with the port(s) or MAC address(es).

Following below are more detailed descriptions of various concepts related to, and embodiments of, techniques for automatically mitigating network security threats. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 illustrates an exemplary local area network architecture for providing connections both between user devices and the Internet. Local area network 100 includes router 104; network switches 110, 120, 130, and 140; and user device 112, 114, 116, 132, 134, 136, 142, and 144. Router 104 is configured as an intermediate node for providing an interface between the Internet 102 and the local area network. In the illustrated local area network of FIG. 1, the router receives network packets from the Internet and routes the received packets towards their intended destination. For the sake of simplicity, the illustrated network is shown with a limited number of network components and user devices, however it should be understood that additional routers, switches, user devices, access points, and other network components not included in the exemplary local area network may be included in the architecture of the network. For example, packets intended for user devices 112, 114, and 116 are routed to network switch 110, and packets intended for user devices 132, 134, 136, 142, and 144 are routed to network switch 120.

In local area network 100, network switch 110 provides connections to user devices 112, 114, and 116; network switch 120 provides connections to network switches 130 and 140; network switch 130 provides connections to user devices 132, 134, and 136; and network switch 140 provides connections to user devices 142 and 144. Network switches provide connections to user devices through any suitable protocol. For example, a data link layer switch, of the Open Systems Interconnection (OSI) protocols model, may identify a Media Access Control address (MAC) address in a data frame for determining the destination for forwarding the received data to the intended device. A network layer switch, of the OSI protocols model, may identify an IP address in a data packet for determining the destination for forwarding the received packet to the intended device. Alternatively, or additionally, network switches may be implemented to handle a combination of data link and network layers protocols for forwarding the received data to the intended device. Other communication protocols may also be used for forwarding received data to the intended device as aspects of the technology described herein are not limited in this respect.

The user devices connected to local area network 100 may be personal computers, smart phones, tablets, personal digital assistants, removable storage media, servers, IoT devices, smart TVs, printers, scanners, copiers, smart watches, and other electronic devices, as aspects of the technology described herein are not limited in this respect. User devices may communicate through a wired connection (e.g., an ethernet connection), or a wireless connection managed by a switch, router, or dedicated wireless access point device.

In local area network 100, a firewall (not shown) may be configured on router 104 (or deployed as a separate device) for providing network security by preventing unauthorized access to the devices and data transmitted within the network. For example, the firewall may be configured between the local area network and the Internet, such that data packets entering and leaving the local area network must pass through the firewall. However, if a device within the network becomes infected by a network security threat, the infected device would be able to access other devices on the network without needing to pass through the firewall.

Figure 2A:
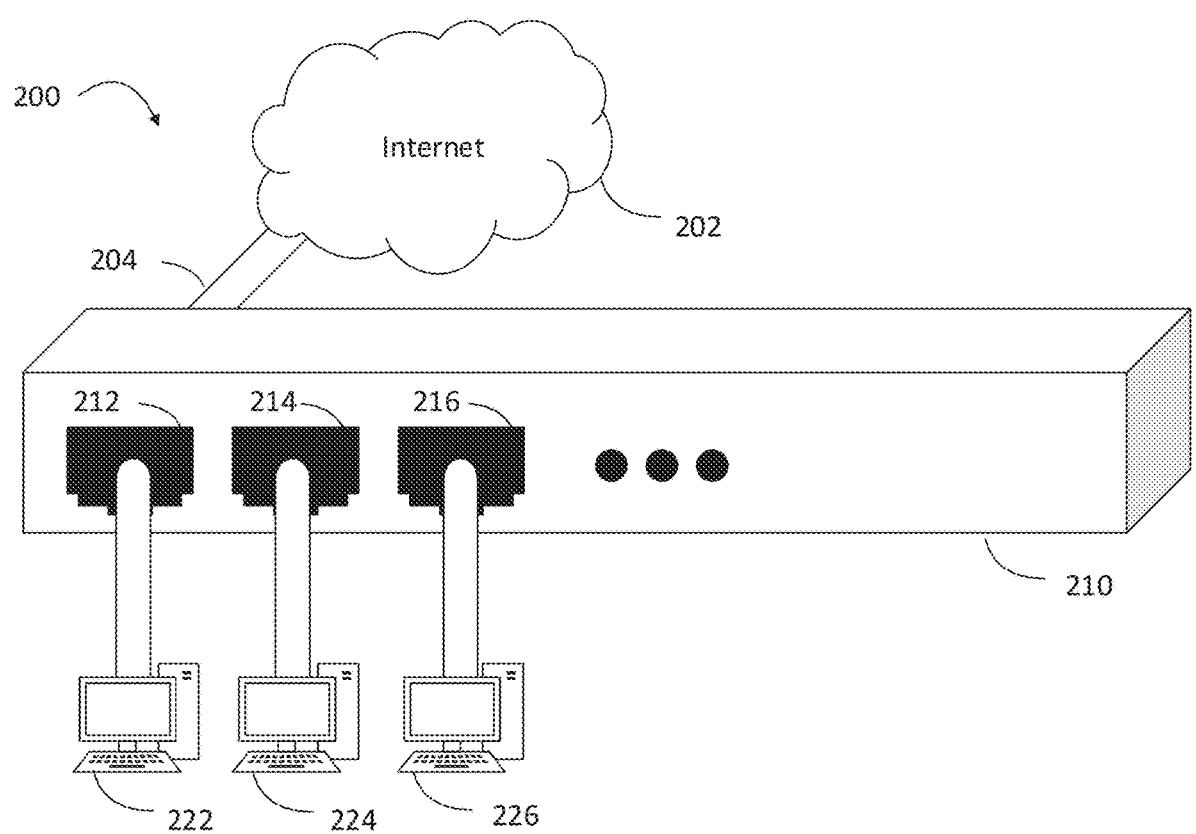
FIG. 2A is a schematic diagram of a network switch system for automatically mitigating a potential network security threat, according to some embodiments described herein.

As described above, the inventor has recognized and appreciated that network security methods and systems configured at the network switch or access point level, can address potential threats at the source and protect the threat from spreading to other devices on the network. By containing threats early and reducing the number of infected devices, data stored in and transferred through the network may be more secure, preventing loss of personal and organizational data. The local area network embodiment illustrated in FIG. 2A is configured using a network switch for automatically mitigating potential threats, according to a network security facility for mitigating network security threats. Examples of methods for mitigating network security threats using a network security facility are discussed in greater detail below, in connection with FIG. 3.

FIG. 2A illustrates a network switch system 200, in accordance with some embodiments. Network switch system 200 includes network switch 210. In the illustrated embodiment, network switch 210 includes connections to user devices 222, 224, 226, and internet connection 202. In some embodiments, network switch 210 includes user ports 212, 214, and 216 for connecting to user devices. For example, user ports 212, 214, and 216 may be ethernet ports for connecting to user device 222, 224, and 226, respectively. Although only three user ports are shown on switch 210, any number of ports may be included for providing connections to user devices. In addition to the user ports, switch 210 also has a linking port 204 for making connections to other network devices in the LAN or the internet connection 202. In some embodiments, network switch 210 may include additional components for connecting to the Internet directly. Alternatively, or additionally, hardware such as routers may facilitate connections between switch 210 and the Internet.

In some embodiments, user devices 212, 214, and 216 may each be similar devices associated with different respective users (e.g., desktop or laptop computers). Alternatively, user devices 212, 214, and 216 may correspond to different types of devices (e.g., printers, network phones, etc.), such as any of the user devices described herein. As will be described below in connection with FIG. 3 block 304, a network security facility may establish baseline behaviors and/or thresholds for each port or MAC address on the switch or access point such that even though the network traffic associated with port 212 may be very different than network traffic associated with port 214 and/or 216, the network security facility can detect potential security threats by determining network traffic is associated with an abnormal behavior.

In some embodiments, network switch 210 includes a network security facility for monitoring the traffic to and from the ports or MAC addresses on the switch or access point. For example, aspects of the network security facility described below in connection with FIG. 3 may be implemented by network switch 210. In response to a network security facility detecting a potential security threat associated with a port or MAC address on the switch, the traffic associated with the potential security threat can be blocked.

Figure 2B:
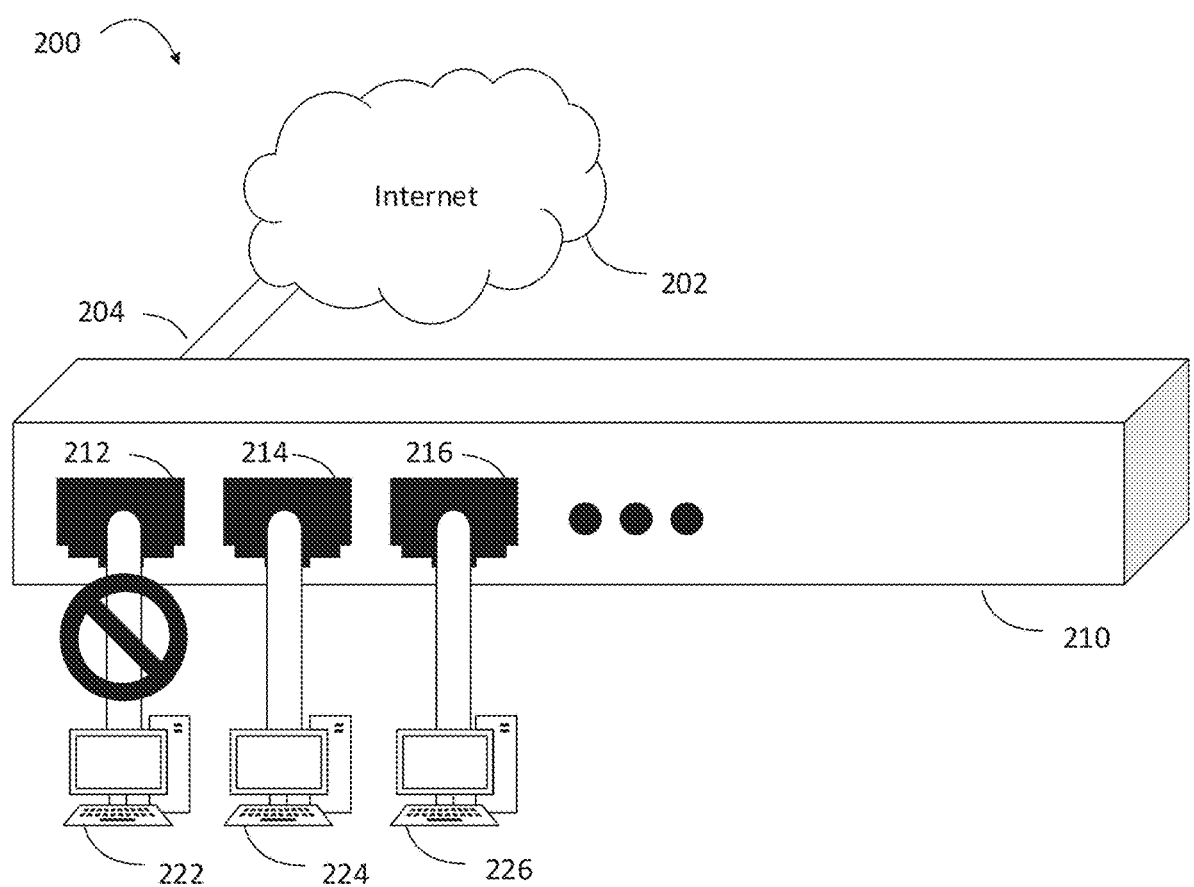
FIG. 2B is a schematic diagram of a network switch system for automatically mitigating a potential network security threat by blocking port access, according to some embodiments described herein.

FIG. 2B illustrates a network switch system 200 blocking a potential security threat, in accordance with the embodiment of FIG. 2A. After the detection of a potential security threat by a network security facility, the switch restricts traffic from the port associated with the potential security threat. For example, if a network security facility determines that traffic associated with user port 212 and user device 222 is a potential security threat, the switch restricts traffic to and from port 212. By restricting traffic associated with port 212, an infection on user device 222 cannot spread to or access data from user devices 224 or 226 through their respective connections to user ports 214 and 216. Additionally, or alternatively, the network security facility, after determining that traffic associated with a user device is a potential security threat, restricts traffic associated with a MAC address associated with the user device, as will be described in greater detail below in connection with FIG. 2D.

In some embodiments, switch 210 may have multiple devices associated with a port of the switch. For example, with reference to switch 120 in FIG. 1, switch 120 may have a first port connected to switch 130 and a second port connected to switch 140. In the illustrated embodiment, the first port handles traffic for user devices 132, 134, and 136 through the first port and handles traffic for user devices 142 and 144 through the second port. When multiple devices are handled through a user port, restricting access to the whole port could disrupt the traffic for all users working on non-infected machines that share the restricted port. In some embodiments, the switch may block network traffic associated with a MAC address of a potential security threat at the port, while other user devices remain unrestricted. In some embodiments, the switch may block network traffic associated with a MAC address. By blocking network traffic associated with a MAC address, other devices that share the same port as the restricted device may maintain unrestricted access, as is discussed in greater detail below in connection with FIG. 2D.

Additionally, or alternatively, an access point may be used for providing wired or wireless connectivity for user devices. In some embodiments, the network security facility may block network traffic associated with a MAC address of a potential security threat at an access point.

In some embodiments, the switch or access point receives a signal from the network security facility, included with the switch or access point, to cause the switch or access point to restrict traffic associated with a user port or MAC address. Additionally, or alternatively, the network security facility may manage the switch or access point traffic directly, such that the network security facility reconfigures the port or MAC address to restrict traffic from a user device. In other embodiments, portions of the network security facility may be located on a network security manager connected to the switch or access point. As such, the switch may receive a signal to cause the switch to restrict traffic associated with the user port or MAC address from a network management device.

Figure 2C:
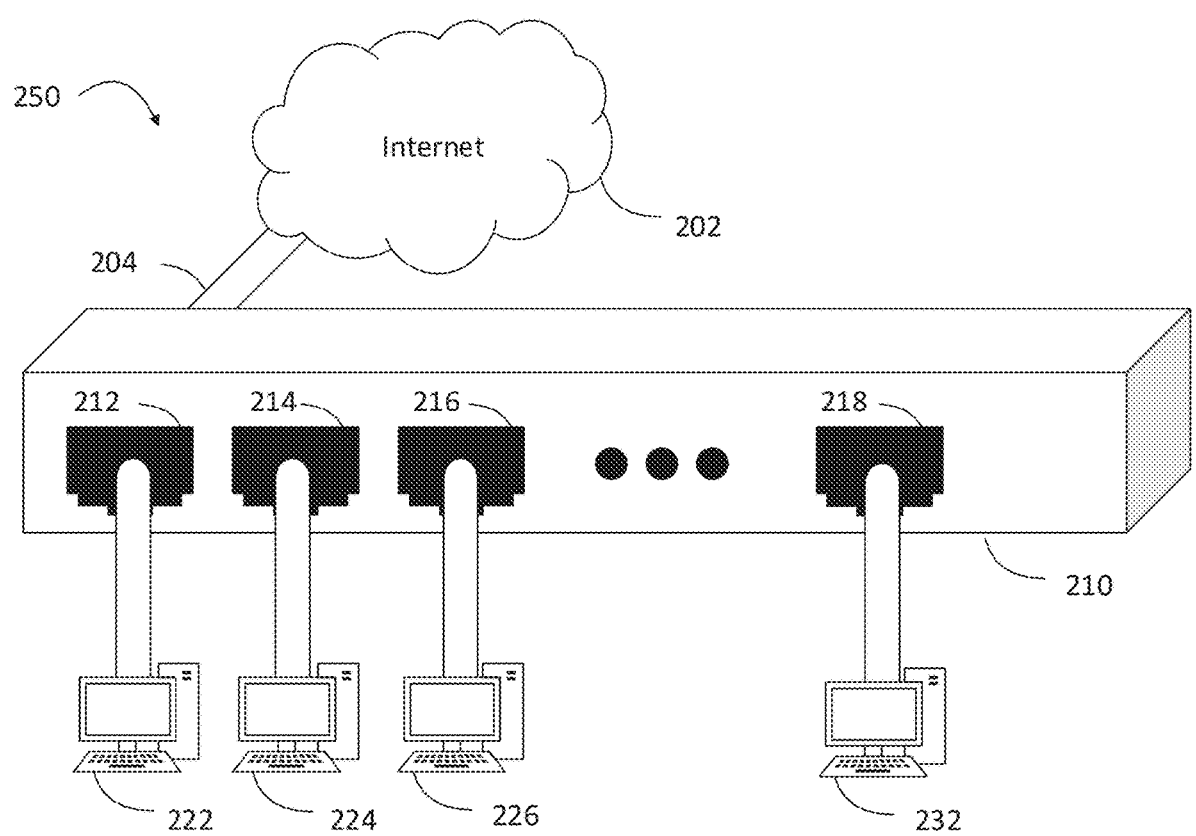
FIG. 2C is a schematic diagram of a network switch system and network monitoring device for automatically mitigating a potential network security threat, according to some embodiments described herein.

FIG. 2C illustrates a network switch system 250 including a network management device, in accordance with some embodiments. Network switch system 250 includes network switch 210, and a network switch managing device 232. In the illustrated embodiment of FIG. 2C, network switch 210 includes connections to user devices 222, 224, 226; internet connection 202; and network switch managing device 232.

For example, user ports 212, 214, and 216 may be ethernet ports for connecting to user devices 222, 224, and 226, respectively. Although only three user ports are shown on switch 210, any number of ports may be included for providing connections to user devices. In addition to the user ports, network switch 210 includes a linking port 204 for making connections to other network devices in the LAN or the internet, and a management port 218 for connecting with a network switch managing device.

In some embodiments, network switch managing device 232 includes a network security facility for monitoring the traffic to and from the ports or MAC addresses on the switch. For example, aspects of the network security facility described below, in connection with FIG. 3, may be implemented by network switch managing device 232. Additionally, or alternatively, network switch managing device 232 may include additional connections to other network components (not shown). For example, network switch managing device 232 may include connections to multiple switches on the network either through separate ports on the network switch managing device, and/or through data sent over the network to network switch managing device 232 through the connection 218 to network switch 210. In some embodiments, monitoring network traffic may be executed using port mirroring of network traffic to the network switch managing device. For example, network traffic associated with a user port or MAC address may be mirrored to port 218 and received by the network switch managing device 232 for monitoring and/or analysis.

In some embodiments, network switch managing device may be configured as an access point managing device. The access point managing device may include a network security facility for monitoring the traffic to and from user devices connected to the access point. For example, aspects of the network security facility described below, in connection with FIG. 3 may be implemented by an access point managing device.

Figure 2D:
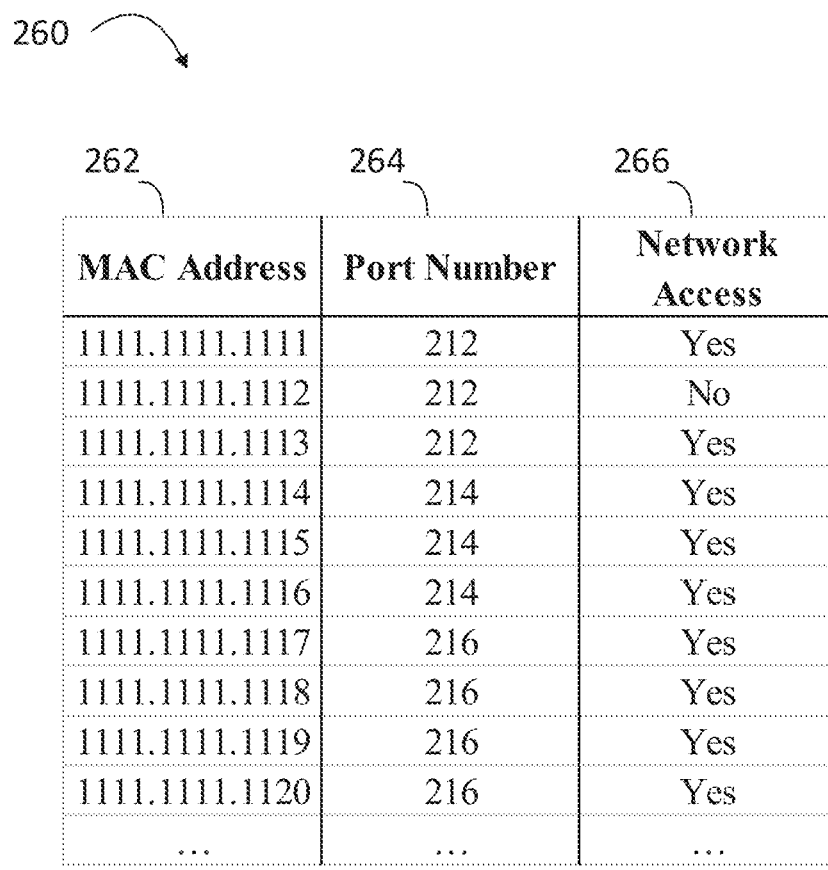
FIG. 2D is an illustrative table associated with controlling access of user equipment to a network based on a MAC Address associated with a user device and a port on a switch, according to some embodiments described herein.

The techniques described herein, in some embodiments, can be applied to switch ports (e.g., a port and therefore all of the traffic flowing through the port) and/or to MAC addresses (e.g., wired and/or wireless MAC addresses) on the LAN. For example, it can be desirable to manage some and/or all traffic at the MAC address level, since if a port has multiple devices (e.g., with different associated MAC addresses) connected to it (e.g., uplinked switches and/or WiFi access points), it can be desirable to control just the identified MAC address(es) rather than an entire port. FIG. 2D illustrates a table associated with controlling the access of user equipment to a network based on a MAC address associated with a user device and a port on a switch or access point. The MAC Address Table 260 illustrated in FIG. 2D may be used in some embodiments in connection with a system like the ones illustrated in FIGS. 2A and 2C. In some embodiments, a switch may have multiple devices associated with a single port. For example, uplinked switches or access points may send network traffic from many devices to a single port on the switch. The associations between a device and a port on the switch or access point may be maintained through a MAC Address Table. In some embodiments, a MAC Address Table 260, as illustrated in FIG. 2D, may be used to monitor associations and/or access between a device and a port on the switch or access point. MAC Address Table 260 includes columns 262, 264, and 266 corresponding to MAC Address, port number, and access status, respectively.

Columns 262, 264, and 266 indicate the MAC addresses associated with each port and the network access status associated with each MAC address. For example, Column 262 includes MAC Addresses 1111.1111.1111, 1111.1111.1112, 1111.1111.1113, 1111.1111.1114, 1111.1111.1115, 1111.1111.1116, 1111.1111.1117, 1111.1111.1118, 1111.1111.1119, 1111.1111.1120; column 264 includes ports 212, 214, and 216; and column 266 includes a "Yes" or "No" network access indicator. As illustrated in FIG. 2D, multiple MAC addresses may be associated with a single port on the switch. MAC addresses 1111.1111.1111, 1111.1111.1112, and 1111.1111.1113 are associated with port 212; MAC addresses 1111.1111.1114, 1111.1111.1115, and 1111.1111.1116 are associated with port 214; and MAC addresses 1111.1111.1117, 1111.1111.1118, 1111.1111.1119, 1111.1111.1120 are associated with port 216. The third column indicates which MAC addresses have access to the network, corresponding to access: yes, and which MAC addresses are restricted, corresponding to access: no. A MAC Address Table such as table 260 may be used in connection with a network security facility to restrict network switch traffic associated with one MAC address without restricting access to other MAC addresses that are associated with the same port as the restricted MAC address. For example, traffic associated MAC address 1111.1111.1112 may be restricted at the switch while MAC addresses 1111.1111.1111 and 1111.1111.1113 may have access to the network.

MAC Address Table 260 may be used in connection with a network security facility to identify potential security threats and restrict network access for the MAC address associated with the network security threat. For example, a network security facility, after determining traffic associated with a MAC address is indicative of a potential security threat, may change a value in the table in the Network Access column from "Yes" to "No." When a value in the Access column associated with a MAC address is set to no, the switch will restrict the incoming and/or outgoing traffic associated with the MAC address. In some embodiments, a MAC Address Table, as illustrated in FIG. 2D may be used in connection with process 300 described below. In some embodiments, other configurations for monitoring and/or restricting the network access of a MAC address associated with user device and a port or access point are possible, as aspects of the technology described herein are not limited in this respect.

In some embodiments, MAC Address Table 260 may include additional columns additional information associated with a MAC Address. For example, MAC Address Table 260 may include columns corresponding to quality of service, address type, vlan ID, age, and other parameters associated with the switch and/or user device. MAC Address Table 260 may be implemented as part of computer-executable instructions for controlling the operation of a switch and may be implemented using hardware, software, or a combination of hardware and software as described herein.

In some embodiments, the traffic may be completely restricted. In other embodiments, the traffic may be forward to a different port or MAC address on the switch or access point for further processing. In yet other embodiments, the traffic may be restricted according to a set of rules for allowing limited access to the network from the restricted port or MAC address.

Figure 3:
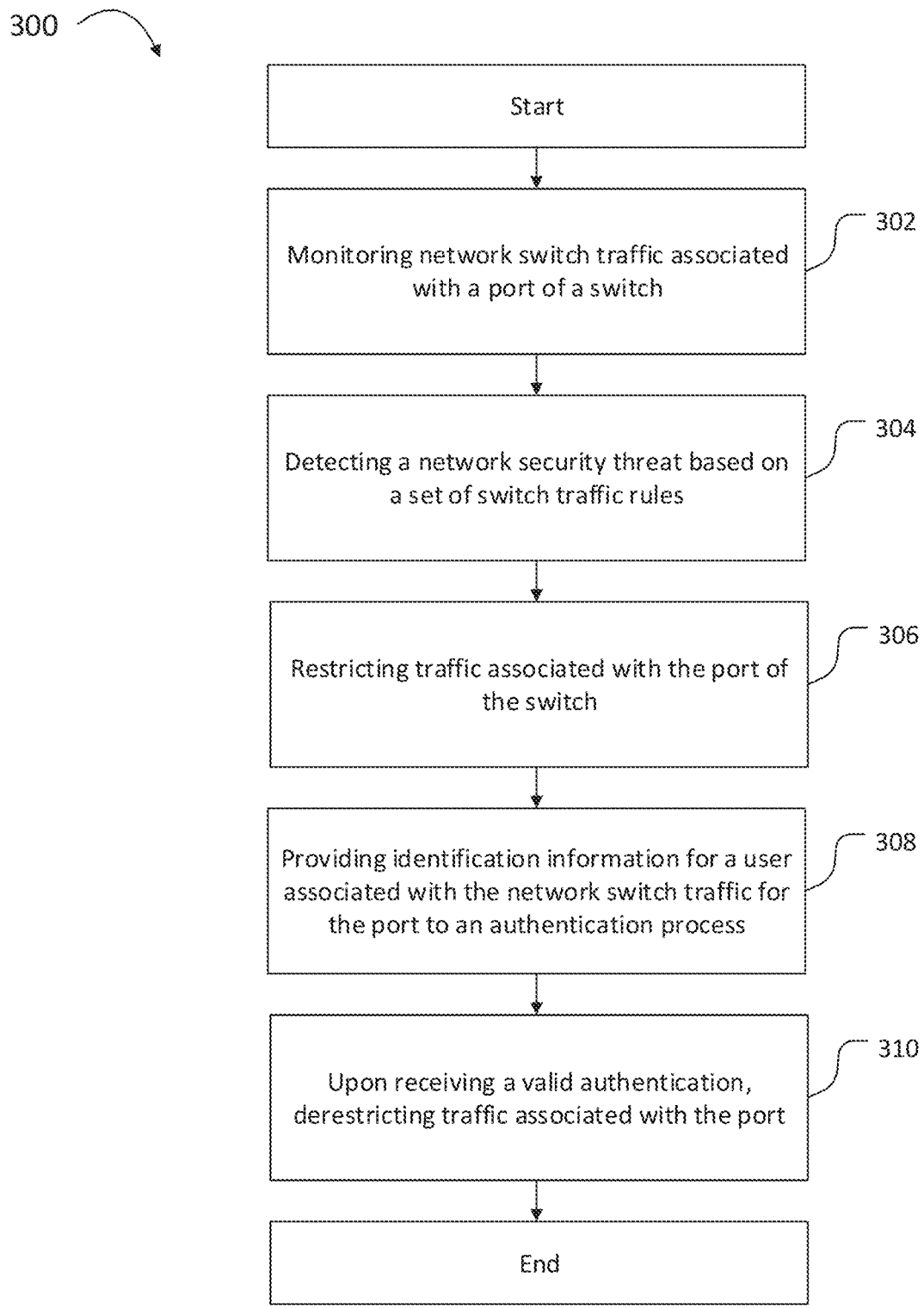
FIG. 3 is a flowchart of an illustrative process 300 for automatically mitigating a potential network security threat, in accordance with some embodiments described herein.

FIG. 3 is a flowchart illustrating a method 300 for operating a network switch or access point by a network security facility, in accordance with some embodiments. Method 300 may be used in connection with a system like the ones illustrated in FIGS. 2A and 2C to perform automatic mitigation of potential network security threats. For ease of description, the process 300 will be described in connection with frames of a network switch operating at layer 2 of the OSI model, the data link layer. In some embodiments, process 300 could also be implemented using packets, segments, or bits, corresponding to other layers of the OSI model. In some embodiments, process 300 may be implemented using an access point. Process 300 may be implemented at any layer of the network or may be implemented across layers, as aspects of the technology described herein is not limited in this respect.

Prior to the start of process 300 of FIG. 3, a network switch may collect data associated with network traffic on the switch to determine historic network switch data, including baseline activity or behavior associated with ports or MAC addresses on the switch. Additionally, in some embodiments, ports or MAC addresses on the switch are registered with a user authentication facility, as will be described below with reference to block 308.

In some embodiments, process 300 may begin at block 302 in which the network security facility monitors network switch traffic associated with a port or MAC address on the switch. For example, the network security facility receives data associated with the switch traffic. In some embodiments, the data received by the network security facility may be the traffic associated with the port or MAC address before it is forwarded to the intended destination. In other embodiments, the data may be a duplicate of the data associated with the port or MAC address.

Additionally, or alternatively, the network monitoring facility may receive data corresponding to metadata associated with encapsulation of the frame. For example, metadata may include port number, network address, identification codes, error-checking information and/or other information that may be contained in a header or trailer.

Additionally, or alternatively, the network security facility may receive processed data corresponding to the network switch traffic. For example, the processed data may include a statistical analysis of the switch traffic including a comparison to reference switch traffic. In some embodiments, the reference switch traffic may be historic switch traffic data from the same port or a port associated with a similar device. In some embodiments, the reference switch may be historic switch traffic data from the same MAC address or a MAC address associated with a similar device. Additionally, or alternatively, the reference switch traffic may correspond to the network switch traffic from multiple ports or MAC addresses on the same switch, multiple switches, or all the monitored switches in the local area network.

At block 304, the network security facility detects a network security threat based on a set of switch traffic rules. For example, the network security facility may use switch traffic rules for detecting abnormal network traffic that may be indicative of a network security threat. Some example switch traffic rules include one or more of: 1) determining if a volume of the port or MAC address traffic exceeds a set threshold volume of port or MAC address activity associated with the port or MAC address; and 2) determining if a destination for the port or MAC address activity traffic is not included in the baseline traffic data. In some embodiments, rule 1 or rule 2 may be used alone. In other embodiments, both rule 1 and rule 2 may be used. In yet other embodiments, different rules or combinations of rules may be used for different user devices connected to the switch, as the techniques are not so limited.

In some embodiments, determining if a volume of the port or MAC address traffic exceeds a set threshold volume, associated with the port or MAC address, is based on a historic volume of network traffic. For example, the threshold volume of a port or MAC address may be based on a historic volume of the port or MAC address. The historic volume may be determined once. For example, the historic volume from a port or MAC address on a switch may be determined during the first day, week, month, or according to another time period when the device is first connected to the switch. Alternatively, or additionally, the historic volume may be detected periodically. For example, the volume from a port or MAC address on a switch may be determined once a day, once a week, once a month, or according to another time period. Additionally, or alternatively, the historic volume may be determined based on the most recent volume of the preceding day, week, or month. In other embodiments, the threshold volume of a port or MAC address may be a preset threshold volume. If the traffic exceeds the threshold volume, the network security facility determines that the traffic is associated with a potential threat.

In some embodiments, the threshold volume may be 30%, 50%, 100%, or 200% of the determined historic volume of the port or MAC address. In some embodiments, the threshold volume of port or MAC address activity may change throughout the day based on the historic fluctuations of network traffic associated with the port or MAC address.

In some embodiments, determining if a destination for the port or MAC address activity traffic is not included in the baseline traffic data is based on historic destinations of network traffic associated with the port or MAC address. For example, the baseline traffic data may be determined once, periodically, or based on the most recent destinations, as described herein in connection with determining the historic port or MAC address traffic volume. If the port or MAC address activity traffic does not match the baseline traffic the network monitoring facility determines that the traffic is associated with a potential threat.

In some embodiments, baseline destinations for the port or MAC address may be based, at least in part, on the type of device associated with that port or MAC address. Additionally, or alternatively, the baseline destinations may include a security access level, such that devices may be restricted to accessing security levels associated with the baseline destinations for the type of device associated with the port or MAC address.

At block 306, the network security facility restricts traffic associated with a port or MAC address of the switch. In some embodiments, upon determining that network traffic is associated with a potential threat, the network security facility automatically restricts traffic to and from the port or MAC address associated with the source of the potential threat. For example, as described above with reference to FIG. 2B, communications to and from an ethernet port associated with the device may be blocked. As another example, as described above with reference to FIG. 2D, communications associated with a MAC address may be blocked. When blocked, the user device cannot communicate with other devices connected to the switch, access point, or within the LAN. As another example, the access to the port or MAC address may not be completely blocked, instead the traffic from the port or MAC address may be restricted such that the traffic is forwarded to a dedicated port or MAC address for receiving potential security threats. The dedicated port or MAC address for receiving potential security threats may implement additional processes to analyze the potential threat, save session information such that it can be resumed at a later time, and/or interface with the user to provide additional information regarding the traffic identified as a potential threat. To mitigate the risk of user lockouts that can arise when automatically restricting port or MAC address access, an authentication process allows a user to verify legitimate network activity. In response to receiving a valid authentication, network security facility may derestrict port or MAC address access. Thus, user lockouts may be prevented.

At block 308, the network security facility provides identification information, for a user associated with the network switch traffic, to an authentication process. In some embodiments, the authentication process includes a multi-factor authentication (MFA) process. For example, after detecting a potential security threat and restricting access to the port or MAC address associated with the potential security threat, the network security facility generates an authentication token. In some embodiments, the authentication token includes an identification associated with the restricted port or user device and an identification of a user associated with the restricted port. For identifying the restricted port, the network security facility may use the MAC address associated with the user device, an Organizationally Unique Identifier (OUI), Extended Unique Identifier (EUI) or network specific identifier such as a name, alias, or serial number specific to the port or user device. In some embodiments, the network security facility will identify a user associated with the port through a look up table, username provided when connecting to the network, or user identification may be managed by a $3^{rd}$ party authenticator application (e.g., Duo MFA, OKTA Adaptive MFA, RSA Secure ID, etc.). Other methods of identifying the port and the user associated with the port may be used, as aspects of the technology described herein are not limited in this respect.

Additionally, or alternatively other methods of user authentication may be used. For example, personal identification numbers (PIN), username and password, challenge response, security question, and/or biometric identifiers may be used. Additionally, other methods of authentication may be used as aspects of the technology described herein are not limited in this respect. In some embodiments, single authentication may be used. In other embodiments, multi-factor authentication may be used. In yet other embodiments, the authentication method may depend on the detected potential security threat.

In some embodiments, the authentication token is sent to an administrator in addition to being sent to the user, such that either the administrator or the user may authenticate the token to derestrict the user's port or MAC address. In some embodiments, different threats may be responded to using different authentication tokens. For example, for threats that may post a large risk to the system, the token may only be sent to an administrator. As another example, following a first potential threat where the user and the administrator both received a first token, if the same potential threat is reoccurring, the subsequent authentication tokens may only be sent to an administrator.

At block 310, the network security facility, upon receiving a valid authentication, derestricts traffic associated with the port or MAC address on the switch. In some embodiments, after the network security facility receives a valid authentication, the restricted port or MAC address is derestricted, allowing the user device connected to the port or MAC address to access the network.

Once the network port or MAC address associated with the false security threat is derestricted process 300 of FIG. 3 ends. Following the process, in some cases, the network security facility is modified to reduce the probability of another false alarm being created in response to network switch traffic associated with a user. For example, new rules may be created specific to the user, port or MAC address associated with the false security threat. Additionally, or alternatively, the historic data associated with the port or MAC address may be updated to reduce the probability of another false alarm.

Figure 4:
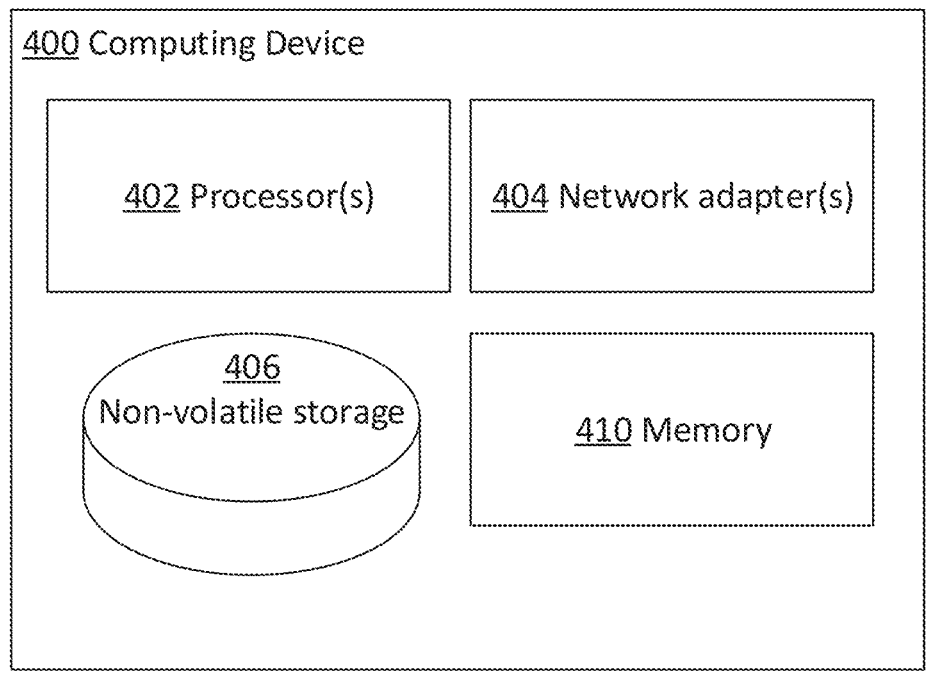
FIG. 4 is a schematic diagram of an illustrative computing device with which aspects described herein may be implemented.

FIG. 4 illustrates one exemplary implementation for a computing device in the form of a computing device 400 that may be used in a system implementing techniques described herein, although others are possible. It should be appreciated that FIG. 4 is intended neither to be a description of necessary components for a computing device to operate as a network security facility in accordance with the principles described herein, nor a comprehensive depiction.

Computing device 400 may comprise at least one processor 402, a network adapter 404, and a computer-readable storage media 406. Computing device 400 may be, for example a desktop or laptop personal computer, a personal digital assistant, a smart mobile phone, or any other suitable computing device. Network adapter 404 may be any suitable hardware and/or software to enable the computing device 400 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer readable media 406 may be a non-volatile storage medium adapted to store data to be processed and/or instructions to be executed by processor 402. Processor 402 enables processing of data and execution of instructions. The data instructions may be stored on the computer-readable storage media 406. The processor 402 may control writing data to and reading data from the computer-readable storage media 406 and memory 410 in any suitable manner, as the aspects of the disclosure provided herein are not limited in this respect.

The data and instructions stored on computer-readable storage media 406 may comprise computer-executable instructions implementing techniques which operate according to the principles described herein. In the example of FIG. 4, computer-readable storage media 406 stores computer-executable instructions implementing various facilities and storing various information as described above. Computer-readable storage media 406 may store a network security facility, in accordance with some embodiments described herein.

While not illustrated in FIG. 4, a computing device may additionally have one or more components and peripherals, including input and output devices. These devices can be used, among other things to present a user interface. Examples, of output devices that can be used to provide a user interface include printers or display screens for visual presentation of output and speakers or other sound generating devices for audible presentation of output. Example of input devices that can be used for a user interface include keyboards, and pointing devices, such as mice, touch pads, and digitizing tablets. As another example, a computing device may receive input information through speech recognition or in other audible format.

Techniques operating according to the principles described herein may be implemented in any suitable manner. The processing and decision blocks of the flowcharts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flowcharts included herein do not depict the syntax or operation of any particular circuit or of any particular programming language or type of programming language. Rather, the flowcharts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flowchart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both," of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase, "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently, "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

All definitions, as defined and used herein, should be understood to control over dictionary definitions, definitions in documents incorporated by reference, and/or ordinary meanings of the defined terms.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

The invention claimed is:

1. A method for automatically mitigating a network security threat, the method comprising:
   storing baseline switch traffic data indicative of traffic that flowed through a network switch, wherein the baseline switch traffic data comprises:
      a plurality of baseline switch traffic sources that transmitted the baseline switch traffic data; and
      associated baseline switch traffic destinations that received the switch traffic data;
   monitoring network switch traffic flowing through the network switch, wherein the network switch traffic:
      is associated with a port of the network switch, a MAC address of a connected device transmitting at least a portion of the network switch traffic, or both; and
      at least some of the network switch traffic comprises:
         a switch traffic source transmitting the at least some network switch traffic; and
         an associated switch traffic destination for receiving the at least some network switch traffic;
   determining, based on a set of switch traffic rules, the network switch traffic is indicative of a potential network security threat, wherein determining the network switch traffic is indicative of the potential security threat comprises:
      comparing the switch traffic destination to the baseline switch traffic destinations of the stored baseline switch traffic data to determine the switch traffic destination is not included in the stored baseline switch traffic data;
   automatically restricting, upon determining that the network switch traffic is indicative of the potential security threat, the network switch traffic associated with the port of the network switch, the MAC address of the device, or both, to prevent the network switch traffic from being transmitted to the associated destination;
   providing identification information, for a user associated with the port of the network switch, to an authentication process, such that the user associated with the port may access the authentication process to allow the automatically restricted network switch traffic associated with the port of the network switch, the MAC address of the device, or both, to be transmitted to the associated destination; and
   upon receiving a valid authentication from the authentication process, allowing the automatically restricted network switch traffic associated with the port of the network switch, the MAC address of the device, or both, to be transmitted to the associated destination.

2. The method of claim 1, wherein:
   monitoring the network switch traffic comprises receiving, from the network switch, the network switch traffic associated with the port or the MAC address;
   determining the network switch traffic is indicative of the potential network security threat comprises determining, from the network switch traffic received from the network switch, the network switch traffic associated with the port or the MAC address is indicative of the potential network security threat;
   restricting the network switch traffic comprises transmitting a message to the network switch to cause the network switch to restrict the network switch traffic associated with the port or the MAC address; and
   allowing the network switch traffic comprises transmitting a message to the network switch to cause the network switch to allow the network switch traffic.

3. The method of claim 1, wherein:
monitoring the network switch traffic comprises monitoring, by the network switch, the network switch traffic associated with the port or the MAC address;
determining the network switch traffic is indicative of the potential network security threat comprises determining, by the network switch, the network switch traffic associated with the port or the MAC address is indicative of the potential network security threat;
restricting the network switch traffic comprises restricting, by the network switch, the network switch traffic associated with the port or the MAC address; and
allowing the network switch traffic comprises allowing, by the network switch, the network switch traffic associated with the port or the MAC address.

4. The method of claim 1, wherein the set of switch traffic rules comprises:
determining if a volume of the network switch traffic associated with the port exceeds a set threshold volume of traffic associated with the port or the MAC address.

5. The method of claim 4, wherein the set threshold volume of traffic associated with the port or the MAC address is determined based on historic volume of traffic associated with the port or the MAC address.

6. The method of claim 4, wherein the baseline switch traffic data is determined based on historic destinations of the network switch traffic associated with the port or the MAC address.

7. The method of claim 1, wherein the authentication process comprises multi-factor authentication for the user associated with the port or the MAC address.

8. The method of claim 1, wherein the authentication process comprises:
determining an authorization token comprising a reference to a restricted port or a MAC address identifier associated with the restricted port or the MAC address, and a user identifier associated with the restricted port or the MAC address;
generating an authentication request associated with the token; and
sending the authentication request to the user.

9. At least one non-transitory computer-readable storage medium encoded with a plurality of computer-executable instructions that, when executed by one or more processors on a computing device, are operable to cause the one or more processors to perform a method for automatically mitigating a network security threat, the method comprising:
storing baseline switch traffic data indicative of traffic that flowed through a network switch, wherein the baseline switch traffic data comprises:
a plurality of baseline switch traffic sources that transmitted the baseline switch traffic data; and
associated baseline switch traffic destinations that received the switch traffic data;
monitoring network switch traffic flowing through the network switch, wherein the network switch traffic:
is associated with a port of the network switch, a MAC address of a connected device transmitting at least a portion of the network switch traffic, or both; and
at least some of the network switch traffic comprises:
a switch traffic source transmitting the at least some network switch traffic; and
an associated switch traffic destination for receiving the at least some network switch traffic;
determining, based on a set of switch traffic rules, the network switch traffic is indicative of a potential network security threat, wherein determining the network switch traffic is indicative of the potential security threat comprises:
comparing the switch traffic destination to the baseline switch traffic destinations of the stored baseline switch traffic data to determine the switch traffic destination is not included in the stored baseline switch traffic data;
automatically restricting, upon determining that the network switch traffic is indicative of the potential security threat, the network switch traffic associated with the port of the network switch, the MAC address of the device, or both, to prevent the network switch traffic from being transmitted to the associated destination;
providing identification information, for a user associated with the port of the network switch, to an authentication process, such that the user associated with the port may access the authentication process to allow the automatically restricted network switch traffic associated with the port of the network switch, the MAC address of the device, or both, to be transmitted to the associated destination; and
upon receiving a valid authentication from the authentication process, allowing the automatically restricted network switch traffic associated with the port of the network switch, the MAC address of the device, or both, to be transmitted to the associated destination.

10. The non-transitory computer-readable storage medium of claim 9, wherein:
monitoring the network switch traffic comprises receiving, from the network switch, the network switch traffic associated with the port or the MAC address;
determining the network switch traffic is indicative of the potential network security threat comprises determining, from the network switch traffic received from the network switch, the network switch traffic associated with the port or the MAC address is indicative of the potential network security threat;
restricting the network switch traffic comprises transmitting a message to the network switch to cause the network switch to restrict the network switch traffic associated with the port or the MAC address; and
allowing the network switch traffic comprises transmitting a message to the network switch to cause the network switch to allow the network switch traffic.

11. The non-transitory computer-readable storage medium of claim 9, wherein:
monitoring the network switch traffic comprises monitoring, by the network switch, the network switch traffic associated with the port or the MAC address;
determining the network switch traffic is indicative of the potential network security threat comprises determining, by the network switch, the network switch traffic associated with the port or the MAC address is indicative of the potential network security threat;
restricting the network switch traffic comprises restricting, by the network switch, the network switch traffic associated with the port or the MAC address; and
allowing the network switch traffic comprises allowing, by the network switch, the network switch traffic associated with the port or the MAC address.

12. The non-transitory computer-readable storage medium of claim 9, wherein the set of switch traffic rules comprises:
determining if a volume of the network switch traffic associated with the port exceeds a set threshold volume of traffic associated with the port or the MAC address.

13. The non-transitory computer-readable storage medium of claim 12, wherein the set threshold volume of traffic associated with the port or the MAC address is determined based on historic volume of traffic associated with the port or the MAC address.

14. The non-transitory computer-readable storage medium of claim 12, wherein the baseline switch traffic data is determined based on historic destinations of the network switch traffic associated with the port or the MAC address.

15. A system comprising at least one processor in communication with memory and a set of additional processing resources, the processor being configured to execute instructions stored in the memory that cause the processor to:
   store baseline switch traffic data indicative of traffic that flowed through a network switch, wherein the baseline switch traffic data comprises:
      a plurality of baseline switch traffic sources that transmitted the baseline switch traffic data; and
      associated baseline switch traffic destinations that received the switch traffic data;
   monitor network switch traffic flowing through the network switch, wherein the network switch traffic:
      is associated with a port of the network switch, a MAC address of a connected device transmitting at least a portion of the network switch traffic, or both; and
      at least some of the network switch traffic comprises:
         a switch traffic source transmitting the at least some network switch traffic; and
         an associated switch traffic destination for receiving the at least some network switch traffic;
   determine, based on a set of switch traffic rules, the network switch traffic is indicative of a potential network security threat, wherein determining the network switch traffic is indicative of the potential security threat comprises:
      comparing the switch traffic destination to the baseline switch traffic destinations of the stored baseline switch traffic data to determine the switch traffic destination is not included in the stored baseline switch traffic data;
   automatically restricting, upon determining that the network switch traffic is indicative of the potential security threat, the network switch traffic associated with the port of the network switch, the MAC address of the device, or both, to prevent the network switch traffic from being transmitted to the associated destination;
   provide identification information, for a user associated with the port of the network switch, to an authentication process, such that the user associated with the port may access the authentication process to allow the automatically restricted network switch traffic associated with the port of the network switch, the MAC address of the device, or both, to be transmitted to the associated destination; and
   allow, upon receiving a valid authentication from the authentication process, the automatically restricted network switch traffic associated with the port of the network switch, the MAC address of the device, or both, to be transmitted to the associated destination.

16. The system of claim 15, wherein the processor being configured to execute instructions stored in the memory that cause the processor to:
   monitor the network switch traffic comprises receiving, from the network switch, the network switch traffic associated with the port or the MAC address;
   determine the network switch traffic is indicative of the potential network security threat comprises determining, from the network switch traffic received from the network switch, the network switch traffic associated with the port or the MAC address is indicative of the potential network security threat;
   restrict the network switch traffic comprises transmitting a message to the network switch to cause the network switch to restrict the network switch traffic associated with the port or the MAC address; and
   allow the network switch traffic comprises transmitting a message to the network switch to cause the network switch to allow the network switch traffic.

17. The system of claim 15, wherein the processor being configured to execute instructions stored in the memory that cause the processor to:
   monitor the network switch traffic comprises monitoring, by the network switch, the network switch traffic associated with the port or the MAC address;
   determine the network switch traffic is indicative of the potential network security threat comprises determining, by the network switch, the network switch traffic associated with the port or the MAC address is indicative of the potential network security threat;
   restrict the network switch traffic comprises restricting, by the network switch, the network switch traffic associated with the port or the MAC address; and
   allow the network switch traffic comprises allowing, by the network switch, the network switch traffic associated with the port or the MAC address.

18. The system of claim 15, wherein the processor is further configured to execute instructions stored in the memory that cause the processor to:
   determine if a volume of the network switch traffic associated with the port exceeds a set threshold volume of traffic associated with the port or the MAC address.

19. The system of claim 18, wherein the processor is further configured to execute instructions stored in the memory that cause the processor to:
   determine the set threshold volume of traffic associated with the port or the MAC address based on historic volume of traffic associated with the port or the MAC address.

20. The system of claim 18, wherein the processor is further configured to execute instructions stored in the memory that cause the processor to:
   determine the baseline switch traffic data is based on historic destinations of the network switch traffic associated with the port or the MAC address.

* * * * *